(12) United States Patent
Schumm, Jr. et al.

(10) Patent No.: US 8,460,119 B2
(45) Date of Patent: Jun. 11, 2013

(54) COMBINATION FOR PASSING AN OBJECT THROUGH A THREE DIMENSIONAL TRUE COLOR IMAGE

(76) Inventors: Brooke Schumm, Jr., Bay Village, OH (US); Brooke Schumm, III, Ellicott City, MD (US)

( * ) Notice: Subject to any disclaimer, the term of this patent is extended or adjusted under 35 U.S.C. 154(b) by 0 days.

(21) Appl. No.: 13/184,972

(22) Filed: Jul. 18, 2011

(65) Prior Publication Data

US 2011/0281660 A1    Nov. 17, 2011

Related U.S. Application Data

(62) Division of application No. 12/210,141, filed on Sep. 12, 2008, now Pat. No. 7,980,957.

(60) Provisional application No. 60/971,803, filed on Sep. 12, 2007, provisional application No. 61/096,738, filed on Sep. 12, 2008.

(51) Int. Cl.
    *A63G 31/16*       (2006.01)
    *A63J 5/00*        (2006.01)

(52) U.S. Cl.
    USPC .............................. 472/59; 472/63; 434/282

(58) Field of Classification Search
    USPC .................. 472/57, 58, 60–63; 359/478, 858; 40/408–411; 434/276, 281, 282
    See application file for complete search history.

(56) References Cited

U.S. PATENT DOCUMENTS

| | | | | |
|---|---|---|---|---|
| 5,257,130 | A * | 10/1993 | Monroe | 359/478 |
| 6,478,432 | B1 * | 11/2002 | Dyner | 359/858 |
| 8,165,434 | B2 * | 4/2012 | Bourget | 385/31 |
| 8,210,694 | B1 * | 7/2012 | McClanahan | 359/858 |

* cited by examiner

*Primary Examiner* — Kien Nguyen
(74) *Attorney, Agent, or Firm* — Brooke Schumm, III; Daneker, McIntire, Schumm, Prince, Manning, Widmann (57) ABSTRACT

The combination of a truly realistic three dimensional real image in color and a second device to produce a repetitive passage of a solid object through the real image creates the illusion of one solid body passing through another. A simple method of accomplishing this is to mount a clock with a pendulum over or under the image and allow a pendulum end to pass periodically through the real image. Other means such as a device running on a circular track could accomplish the same illusory effect. The pendulum end or the device can take various forms as can the real image. In principle the designs are not limited in size. The invention creates an exciting visual and illusory moment of a second object passing through an apparently solid object.

18 Claims, 7 Drawing Sheets

COMBINATION FOR PASSING AN OBJECT THROUGH A THREE DIMENSIONAL TRUE COLOR IMAGE

CONTINUATION DATA

This application is a divisional application of U.S. application Ser. No. 12/210,141, filed on Sep. 12, 2008, being issued as U.S. Pat. No. 7,980,957 on Jul. 19, 2011, which claims priority from and the benefit of a U.S. Provisional Application 60/971,803 filed on Sep. 12, 2007, and a U.S. provisional application 61/096,738 of this name filed Sep. 12, 2008.

DESCRIPTION OF THE INVENTION

Field of the Invention

The invention is a form of novelty device where an interacting hologram-type three dimensional colored real image is intersected periodically with a moving solid object for the consumer, retail or industrial market where the periodic visually surprising illusion serves as an attention attracting display. An amusement ride is also contemplated.

SUMMARY OF THE INVENTION

The combination of a three dimensional hologram-like real image in color and a second device to produce a repetitive passage of a solid object through the real image creates the illusion of one solid body passing through another. A simple method of accomplishing this is to mount a clockworks with a pendulum over or under the image and allow a pendulum end to pass periodically through the real image. Other means such as a device running on a circular track could accomplish the same illusory effect. The pendulum end or the device can take various forms as can the real image. In principle the designs are not limited in size.

BACKGROUND OF THE INVENTION

Various methods of creating in color a hologram-like real image or a hologram exist, and such images can be used to create unusual displays of a scale measurement or digital time or the like. However there has not been a sale or publication of an attempt to capitalize on the assembled mechanical combination of such hologram-like real images with intersecting moving real mechanical assemblies or parts or animals to provide surprising illusions where one solid body appears to pass periodically and repetitively through another to attract viewer attention in three dimensional retail, entertainment, household or industrial displays. Most importantly, there has not been any invention combining the concepts of movable objects cooperating with "real images" where the images are viewable from a 360 degree viewpoint such that one can walk around the image and see the movement, or if in the moving object can look at the approaching object and view the object upon departure from its image field. The view is not merely of an object in color with a perception of depth; the object is visible and examinable by the human eye as a fully three-dimensional object with no loss of depth or stereoscopic integrity.

Monroe, U.S. Pat. No. 5,257,130, Oct. 26, 1993, appears to be the most applicable prior art, but uses parabolic reflectors to project two dimensional images onto a screen to be viewed by a rider in an amusement ride. No three dimensional aspect is involved. There is suggested laser technology generating holograms, but lasers and viewing them have safety issues which the invention does not present. Welck, U.S. Pat. No. 4,802,750, Feb. 7, 1989 discussed the portrayal of a virtual image on the optical axis, but the use of offset parabolas restricts the ability to fully, from all around the object, to see the object and work with and/or portray it. The seminal art involving parabolic reflectors generating a real image from an object with the parabolic mirror assembly is that of Ellings et al, U.S. Pat. No. 3,647,284, Mar. 7, 1972. As described by Welck '750, Ellings '284 creates an image floating above the parabolic mirror assembly. This invention is designed to use various objects to cooperate with the Ellings art and create novel novelty devices.

SUMMARY OF THE INVENTION

It is the object of the invention to create a simple method to make a display comprising a real image created by placing an object at a first focal point of a pair of symmetrical circular parabolic mirrors which mirrors then cast a three dimensional real image in color at the second focal point of the mirrors so that if a central hole is created in the second mirror centered on that second focal point, the three dimensional real image appears outside the mirrors and if then is added to the display a solid device which periodically passes through this real image a visually improbable event seems to occur. Such a periodically passing but non-limiting arrangement can be one end of a pendulum of a clockworks mounted either over or under the real image and the mirrors or in another embodiment an object running around a circular track intersecting periodically with the real image. Since the real image is formed by ordinary light, it does not require special viewing devices to be seen by the viewer's(s') eyes nor does it require protective devices for the eyes if illuminated by normal lighting levels or less. Illumination may be accomplished by any electromagnetic radiation that the mirror will reflect. If converted to visible light, or illuminated by visible light, then the real image can be perceived by the human eye or a visible light sensitive device such as a camera. By contrast, a holographic display involving laser light would require eye protection. There is no requirement of collimated light for this invention as is needed for a hologram or holographic presentation.

DETAILED DESCRIPTION

Figure 1:
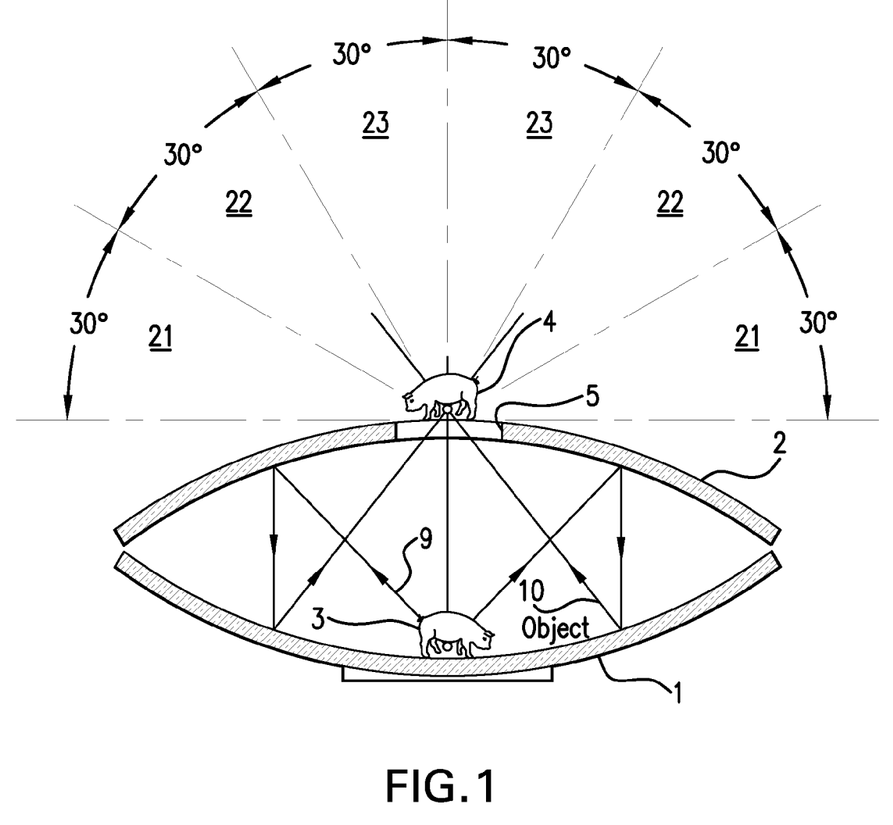
FIG. 1 is an elevational view of an exemplary pair of parabolic mirrors containing an object whose real image is cast through an opening or aperture above (or below if the pair is reversed) the mirrors. The image is only optimally visible when the viewer's eyes are at an angle between 30 and 60 degrees above a real image in a 360 degree circle around the object. The mirrors with the contained object can be tilted to change the location of this viewing angle.

A preferred embodiment is shown in FIG. 1. FIG. 1 is a frontal elevational view of a non-limiting way to create a real image by the means of commercially available parabolic mirrors. The word "real image" is the standard usage in literature to describe the image of the object resulting from the actual object via the parabolic mirrors. If an object (3) or a landscape of one or more objects (the word "object" shall include a landscape or display of one or more objects) is placed on the inside focal point of a parabolic mirror (1) and another matching parabolic mirror (2) with an opening (5) in its center is placed with the opening away from and onsite to the mirror (1), the ambient light striking the object (3) will reflect inside the mirrors on paths (9) and (10) to create a real image (4) of the object at the middle and above opening (5) containing the focal point of mirror (1). The real image may also be thought of as a virtual image. The image of the object is absolutely visually accurate in three dimensions despite being some distance from the object. If the aperture is in the upper mirror, the image is optimally perceived only in an angle of viewing (22), 30 to 60 degrees above the plane of the opening in the center of mirror (2). That plane will be referred to as the "horizontal plane," for description of the angle of viewing, but there is no requirement the plane be horizontal, and the mirrors can be tipped or angled. As long as the observer is within the 30 to 60 degrees of the horizontal plane above the opening, the observer can move circumferentially around the real image and perceive all sides of the image as if it were a solid object. While thirty to sixty degrees of optimal viewing may seem to be an undesirable limitation, the limitation can be alleviated by the placement of the mirrors at an angle or by hanging from an overhead support which reduces this limitation in actual practice a great deal. Also as noted below a skirt or skirts can be added to force the onlooker to use the optimum angle to view the real image. The maximum dimensions of the object (3) are limited to approximately one ninth of the diameter of the particular mirrors utilized in this embodiment. The technically achievable mirror and image size can be very large dependent only on the size of the mirror. If larger than about one ninth of the mirror diameter in the particular mirrors used for the illustration of the preferred embodiment of the invention, the real image (4) may not be seen as complete. However any object (3) which meets this size limitation can be employed in the assembly but the more solid g the object (3) and the sharper the image, the more impressive the illusion. The mirrors can be turned upside down so the opening or aperture faces downward in which case the real image appears below the horizontal plane. The object itself would then be suspended or attached in some fashion.

Figure 2:
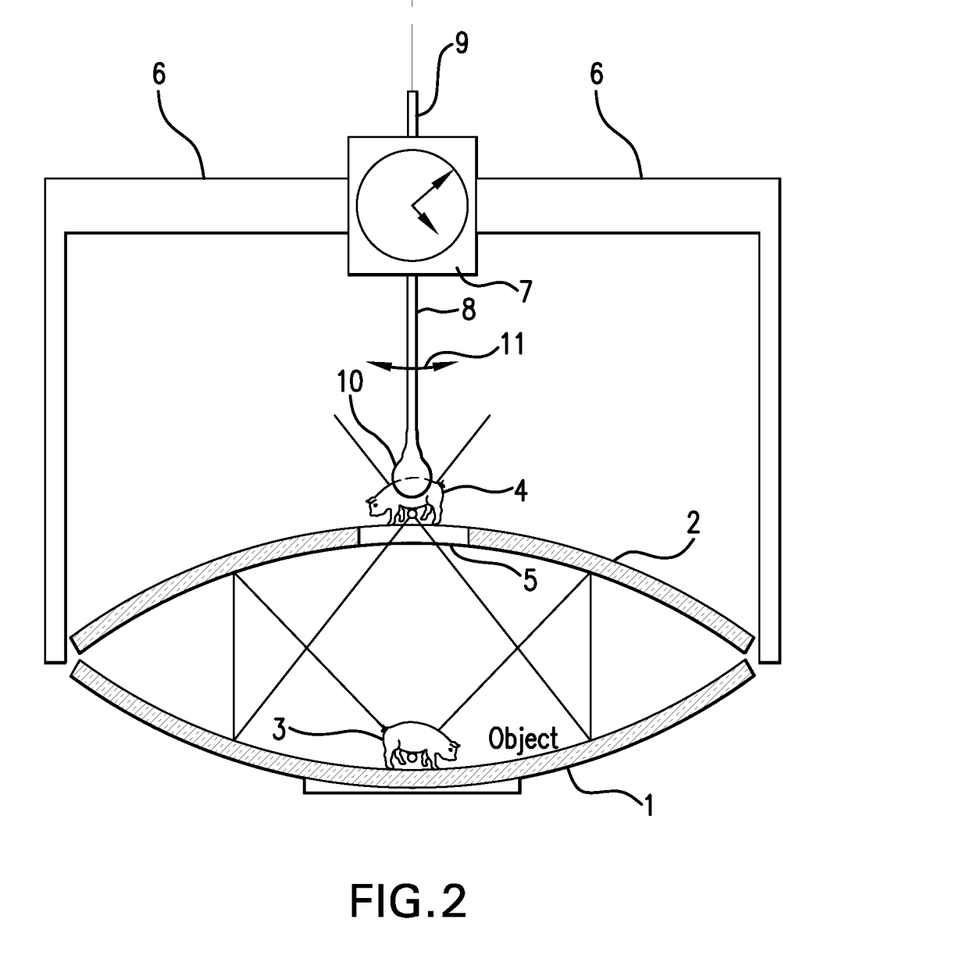
FIG. 2 is a frontal elevational view of the exemplary mirrors and image mounted under an exemplary clockworks with a resting pendulum end or as if the pendulum were in the moment of passage through the real image.

An alternate preferred embodiment is shown in FIG. 2 which shows an embodiment of a frontal elevational view of the mirror pair (1,2) and the imaged object (3) at the lower focal point and the real image (4) residing in the opening (or aperture) (5) with an exemplary clockworks (7) mounted on support structure (6) which resides over and beside and is attached to the mirrors (1,2). The clockworks (7) is equipped with a swinging pendulum (8) with tips (24) and (25), the lower tip (25) resting by gravity in the real image when inactive or as if during the precise moment of passage through the real image when the pendulum is in motion as indicated by the curve with arrows (11). The combined effect of the two images, one an optical real image, and the other an actual object is very persuasive that both of the images represent solid objects. As one image approaches the other the collision is anticipated but never occurs and the unreality of the "real" image impresses the viewer sometimes to the point of unbelief or even fear.

Figure 3:
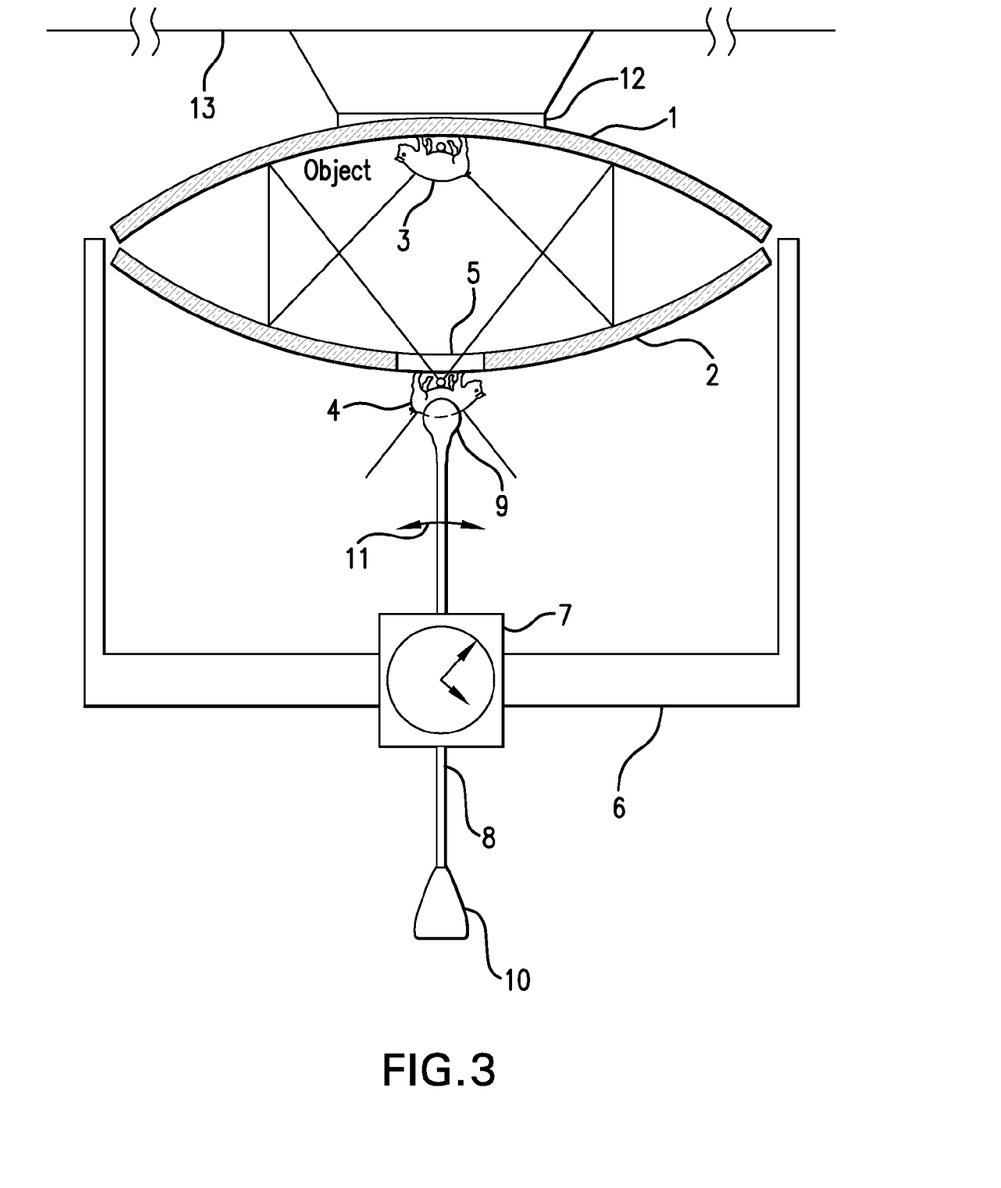
FIG. 3 is a frontal elevational view of the exemplary mirrors and image mounted over an exemplary clockworks with a pendulum end which is passing through the image.

Another preferred embodiment is in FIG. 3 which is a frontal elevational view of the mirror pair (1,2) with the attached imaged object (3) at the focal point of mirror (2) and the real image (4) residing in the opening (5) with an exemplary clockworks (7) mounted on support structure (6) which resides under and beside and is attached to the mirrors (1,2). The clockworks (7) is equipped with a swinging pendulum (8) with tips (24) and (25), here shown ornamented, the upper tip (here extended) illustrated as if during the precise moment of passage through the real image when the pendulum is in motion as indicated by the curve with arrows (11). The structure (6) and mirror (1) are attached to support (12) which in turn is attached to a ceiling or other surface (13). In pendulum clocks the pendulum can be extended in many designs so that the pendulum shaft projects upwards even though the principal action of the pendulum swing is controlled by the lower pendulum and by gravity and the clockworks. Thus in this variant of the possible assemblies an upward simple or ornamented pendulum extension can serve as the solid object passing through the real image as the clockworks and the pendulum actuator operate.

Figure 4:
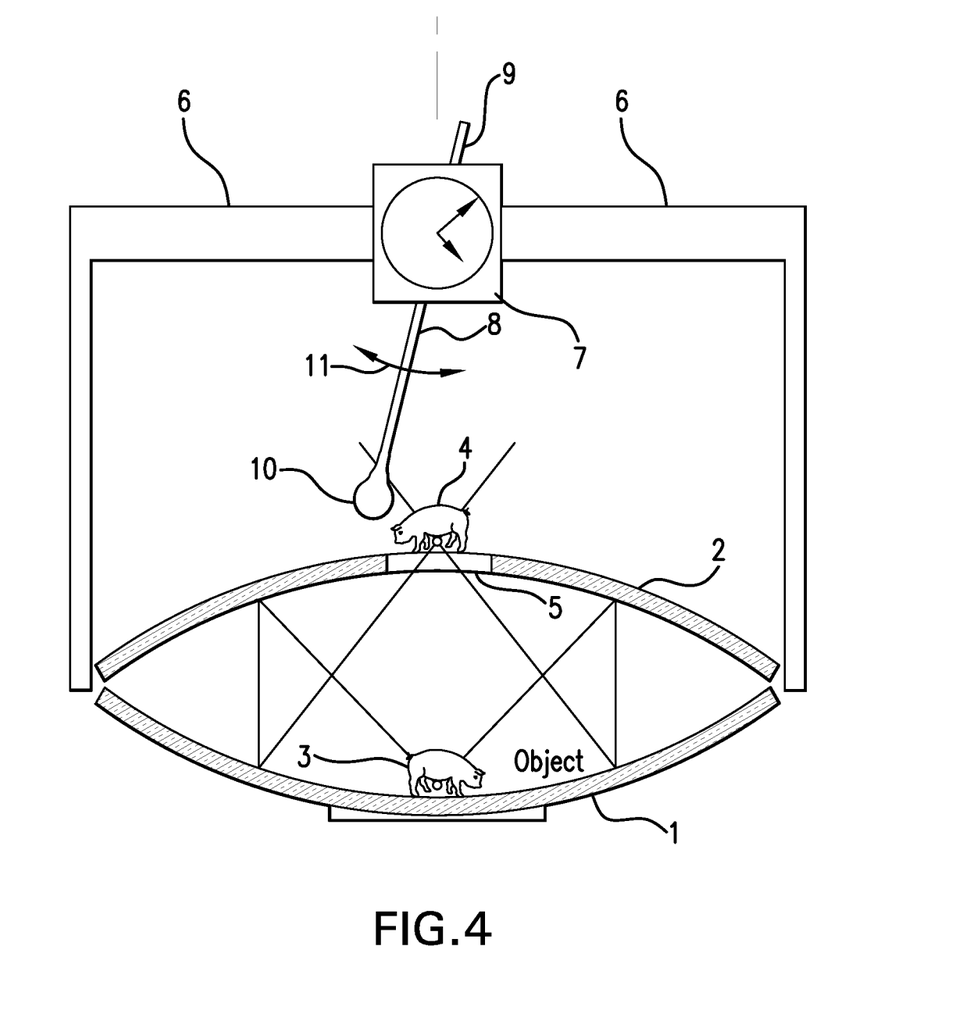
FIG. 4 is an elevational view of the exemplary mirrors and image mounted under an exemplary clockworks with a pendulum end which is about to pass through the image.

Another preferred embodiment as in the frontal elevational view in FIG. 4 is the mirror pair (1,2) and the imaged object (3) at the lower focal point and the real image (4) residing in the opening (5) with an exemplary clockworks (7) mounted on support structure (6) which resides over and beside and is attached to the mirrors (1,2). The clockworks (7) is equipped with a swinging pendulum (8) with tips (24) and (25), the lower tip (10) about to pass through the real image as the pendulum swings along its downward path of motion as indicated by the curve with arrow (11). This figure illustrates the assembly when the moving pendulum in this case is not in the center position when the clockworks and pendulum actuator are operating.

Figure 5:
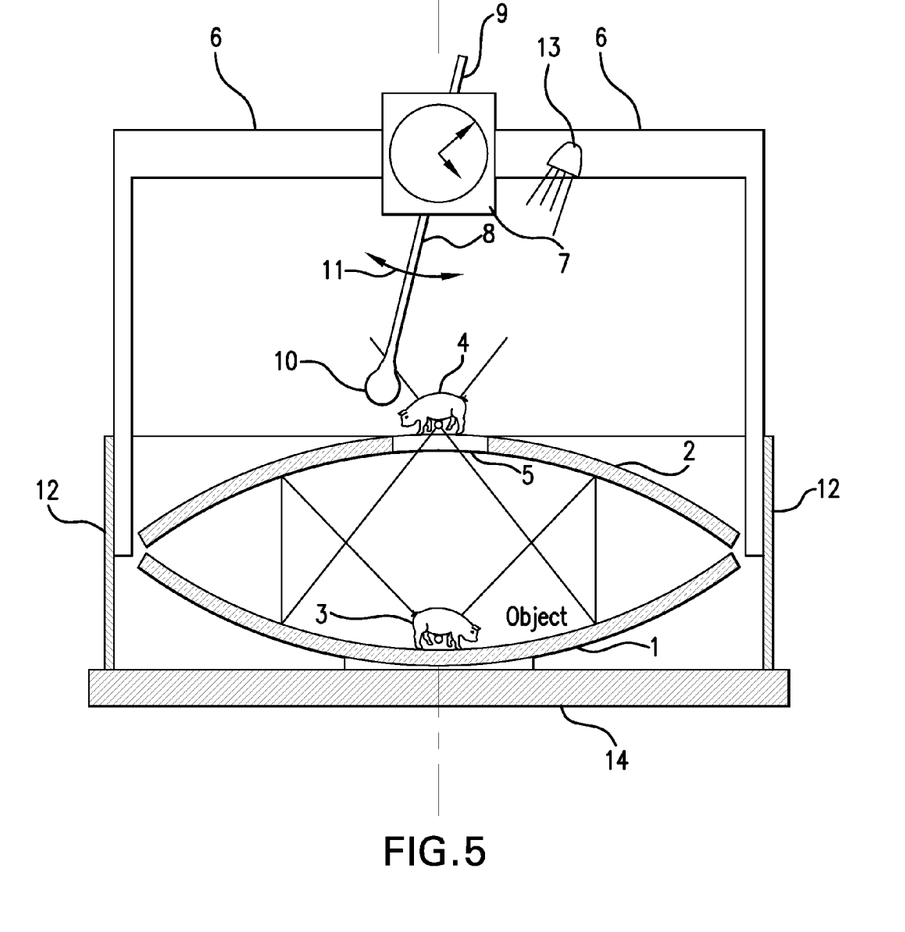
FIG. 5 is an elevational view of an exemplary assembly where a mounting plate, a skirt and a beam creating lighting device (which enhances the solid appearance of the real image) are added to the group of the mirrors and a clockworks where the said clockworks are mounted over the mirrors and real image.

Another embodiment is illustrated in FIG. 5 in a partially cross-sectional frontal elevational view of the mirror pair (1,2) and the imaged object (3) residing below in the opening (5) and the real image (4) appearing above the imaged object with an exemplary clockworks (7) mounted on support structure (6) which resides over and beside and is attached to the mirrors (1,2) and a base plate (14). The clockworks (7) is equipped with a swinging pendulum (8) with tips (9) and (10), the lower tip (10) about to pass through the real image as the pendulum swings along its downward path of motion as indicated by the curve with arrow (11). The assembly is enhanced structurally and visually by an attractive, perhaps reflective skirt (26) around the mirror section, all mounted on the base (14). A beam, preferably the width of the real image, cast by a light source such as but not limited to a small battery powered flashlight with either an incandescent bulb or an LED light source or a small 12 volt light is mounted on the clock support structure so as to shine on the real image (4) which lighting surprisingly enhances the solid appearance of real image (4) significantly. This use of a skirt (26) encourages the observer to view the display only in the thirty to sixty degree arc above the horizontal plane of optimal viewing as intended in the design and also can be decorative, enhancing the attractiveness of the assembly. Optimally, the skirt has a top edge which is on the upper ray of a 30 degree angle whose horizontal ray corresponds to the top of the mirror with a hole in it. The clockworks and the light source can be battery operated or connected to a source of power such as a household outlet. The presence of the larger base makes the whole assembly more stable and can be attractively decorated or of a modified form such as having a scalloped edge. The base can also be structured so as to tilt the assembly to any angle desired.

Figure 6:
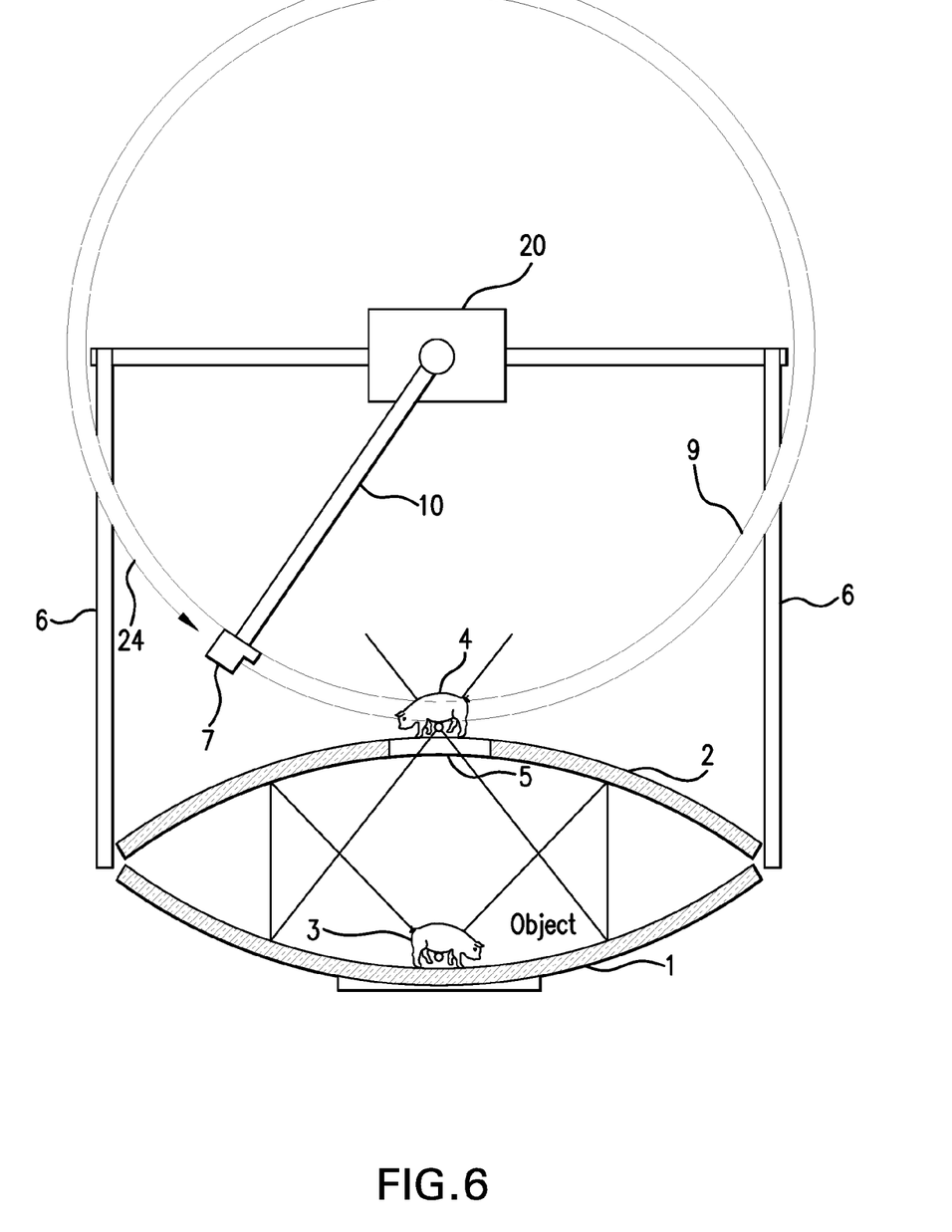
FIG. 6 is an elevational view of the exemplary mirrors and image where a device rotating on an arm passes through the image on a periodic basis.
Figure 7:
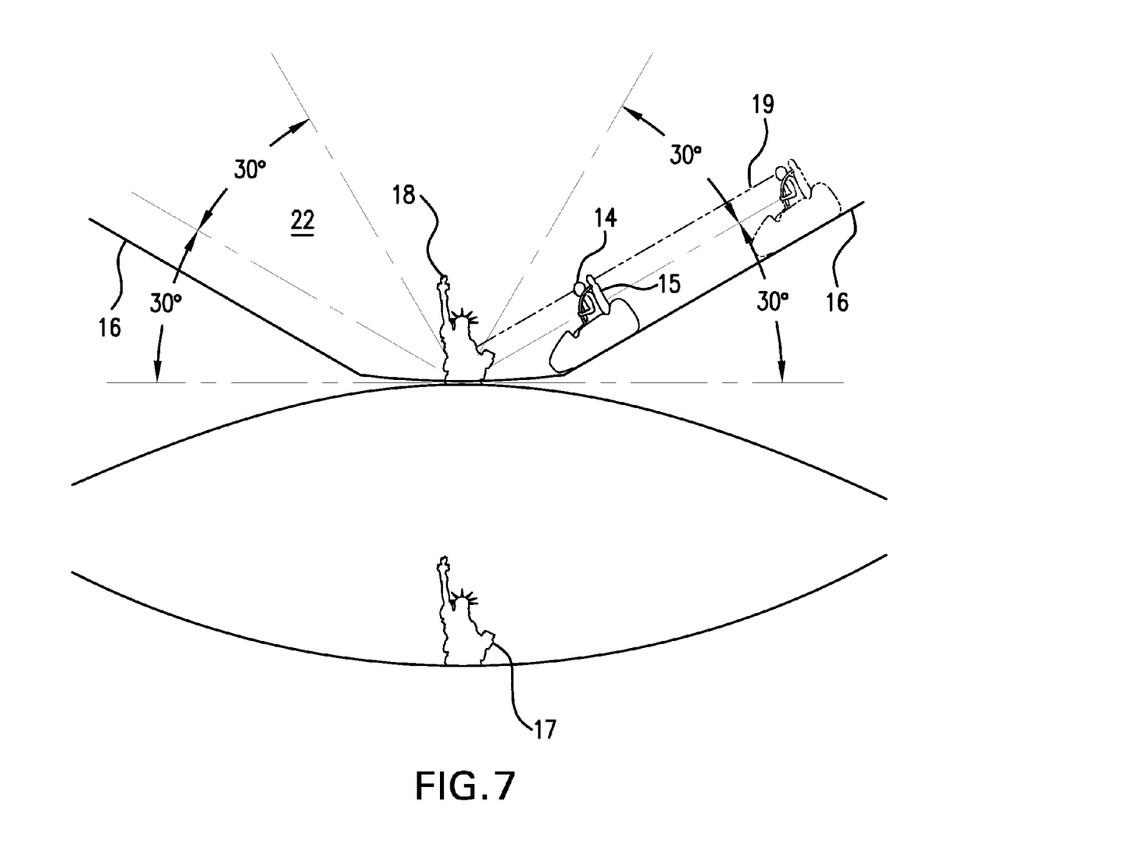
FIG. 7 shows a configuration of an amusement park ride where a rider is in an initial position and then moving forward on a track with his or her eye approaching the object between 30 and 60 degrees above the horizontal. The rider believes and sees him or herself to be riding into and ultimately through a real image view, a fully stereoscopically perceived solid object, in this instance the figure shows a model of the Statue of Liberty.

Another preferred embodiment is in FIG. 6 as an exemplary elevational view. A different approach to creating the illusion is shown. The mirror pair (1,2) accomplishes the real image (4) appearing above the opening (5) with an exemplary rotating arm 10 mounted on support structure (6) which resides over and beside and is attached to the mirrors (1,2). The rotating arm (28) operated by a miniature motor assembly and case (20) supports and guides a mobile object (21) causing object (21) to pass through the real image as the object (7) goes around the circle in a path of motion as indicated by the arrow (8). Another design approach could also be used where the moving solid object (21) comprises or is attached to or is resting in a small vehicle on a track so it passes through the real image (4). If the track has two rails it must straddle the central opening (5) or the real image will be partially obscured diminishing the visual impact of the display. The moving object (21) could be a small model airplane or any other of a variety of objects. The motor operating the arm and any other part required for the operation of the assembly can be either powered by a battery or by connection to a utility power line or household outlet or a solar cell power source or even a wound spring. Since the real image is formed by ordinary light, it does not require special viewing devices for the viewer's(s')s eyes to be seen nor does it require protective devices for the eyes if illuminated by normal building lighting levels or less. Illumination may be accomplished by any electromagnetic radiation that the mirror will reflect. If converted to visible light, or illuminated by visible light, then the real image can be perceived by the human eye or a visible light sensitive device such as a camera. By contrast, a holographic display involving laser light would require eye protection. If illuminated by infrared or ultraviolet light, the image would be perceived in those wavelengths. If the image by its nature changes the wavelength of the incident light to visible light, such as by fluorescence, then the image could be seen in the visible light spectrum. FIG. 7 shows a rider (23) sitting in a vehicle or car (15) riding on a track (16). The sightline (19) of the rider (23) is between angle of viewing (22) of 30 and 60 degrees above the horizontal plane of the aperture of the parabolic mirror combination, also referred to as the base image portrayal device. The rider perceives him or herself literally smashing into the stereoscopic high quality real image (18) of the model of the Statute of Liberty, the actual object (17) being situated adjacent to the lower parabolic mirror.

A preferred embodiment includes an image casting means such as but is not limited to the approximately nine inch parabolic mirror pair which is available from Optigone International of St. Louis, Mo. and Ojai, Calif. through www.optigone.com/order.htm and the company's dealer network. These particular mirrors can be either nine inches or twenty two inches in diameter, the larger capable of creating a more powerful effect. The real image can be created with any object approximately one ninth in each dimension of the diameter of the mirror pair used in the preferred embodiment. A preferred periodic oscillating device to penetrate the real image is at least one pendulum driven by a clock movement. The required clock movements and associated parts including special pendulums can be obtained from Klockit® clockmakers supply of Lake Geneva, Wis. including through their website at www.klockit.com, or 1-800-556-2548 or similar clock parts suppliers or Michaels, Inc., which has stores throughout the United States and is based in Irving, Tex. Support structures on which to mount the mirrors and the clockworks can be custom made in a non-limiting description from wood or metal as desired to create an attractive design. Wood bases can be obtained from retail vendors such as Michaels, Inc. or cut from wood pieces obtained at lumber suppliers or specialty stores. The skirts can be made and cemented or taped together from copper or aluminum flashing available from building suppliers such as Home Depot, Inc of Atlanta, Ga. or Lowes, Inc. of Mooresville, N.C., or thin wood such as veneers or other metal or plastic sheeting. The skirt, which if titanium or aluminum can be anodized, can be enhanced by colored or aluminized decorative polymer or metal sheeting cut to size or special shapes and laminated or cemented to the skirt or other parts. Preferably the skirt or skirts will be of such a height as to limit the angle of viewing to the optimal angle. Lighting devices, systems and battery operated flashlights can be obtained from electrical lighting stores or Lowes, Inc. as examples. The motors and lights can be powered by batteries in appropriate holders, or connected to household outlets or utility lines or solar cell power or even powered by springs and generators. Large size designs would require custom manufacture but the principles of the designs would remain the same.

Another preferred embodiment with an object moving on an arm or a track must include an image casting means such as but not limited to the parabolic mirror pair which is available from Optigone International through www.optigone.com/order.htm and the company's dealer network. These particular mirrors can be either nine inches or twenty two inches in diameter, the larger capable of creating a more powerful effect. The real image can be created with any object approximately one ninth in each dimension of the diameter of the mirror pair. If required the clock movements and associated parts including special pendulums can be obtained from Klockit® at www.klockit.com or 1-800-556-2548 or similar clock parts suppliers or Michaels, Inc. Other motor drives are available as device drivers from Klockit® or Michaels, Inc. or in a variety of forms from a supplier such as James Electronics, LTD, 1355 Shoreway Rd. Belmont, Calif. 94002-4100. Support structures on which to mount the exemplary mirrors, clockworks, motors, lights and other design features desired can be custom made in a non-limiting description from wood or metal strips, dowels or tubing as desired to create an attractive design. Wood or metal bases can be obtained from retail vendors such as Michaels, Inc. or cut from wood or metal pieces obtained at lumber and hardware suppliers or specialty stores. One or more skirts can be made and cemented or taped together from copper or aluminum flashing available from building suppliers such as Home Depot, Inc or Lowes, Inc. or thin wood such as veneers or other metal or plastic sheeting. Such a skirt, which if titanium or aluminum can be anodized, can be enhanced by colored or aluminized decorative polymer or metal sheeting cut to size or special shapes and laminated or cemented to the skirt or other parts. Ideally the skirt should be of such a height as to oblige the viewer to see the moving part or parts from the optimal 30 degree angle. Lighting devices, systems and battery operated flashlights can be obtained from electrical lighting stores or Lowes, Inc. as examples. The motors and lights can be powered by batteries in appropriate holders, or connected to household outlets or utility lines or solar cell power or even powered by springs and generators. The one or more rotating arms or the tracks can be made from wood doweling or metal tubing or strips and other fasteners and decorative features from sources such as Michaels, Inc., JoAnn Fabrics, Inc. of Cleveland Ohio, with a nationwide chain of stores, or Hobby Lobby, Inc. of Oklahoma City, Okla. or industrial suppliers. One or more skirts and a base could be added to the design if desired as noted previously. Large size designs would require custom manufacture but the principles of the designs would remain the same. The principles applicable to a clock can relate to any object which is proposed to be passed through the "real image."

A further embodiment is to create an amusement park ride. A rider would have the incredible experience, if approaching the image from an angle 30 degrees to 60 degrees from the plane formed by the aperture of the parabolic mirror through which the image is appearing of seeing what appeared to be a solid object and then apparently smashing into the object and passing through it, and if unconvinced and if emerging at a 30 degree to 60 degree angle, looking back behind and seeing the object again appearing fully solid. The ride could be a small vehicle with multiple persons, or a single rider vehicle guided on a track.

The experience could be further enhanced by making copies of the object which is portrayed in the real image. By disposing other parabolic combinations around the base image parabolic combination, and disposing the just described copy in parallel to the original object, and adjusting the object and parabolic combination so the images from the various parabolic combinations are coincident, the shadow generated over the light from the illuminated image as a track or ride passed over the second mirror aperture would be lessened or eliminated and the visual experience enhanced. By placing four parabolic combinations, and even a fifth top parabolic combination, one could virtually eliminate shadowing and create a very surreal experience.

The embodiments represented herein are only a few of the many embodiments and modifications that a practitioner reasonably skilled in the art could make or use. The invention is not limited to these embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

We claim:

1. A novelty device whereby a second object passes without damage through a high quality three-dimensional copy of a first illuminated object, comprising:
    a first concave parabolic mirror having a central axis from the center of the mirror to the focal point of the minor and said first minor being outwardly convex from said focal point;
    a second concave parabolic minor having a central axis from the center of the mirror to the focal point of the mirror and said first minor being outwardly convex from said focal point, said central axis of said second mirror being coincident to said central axis of said first minor;
    said first concave parabolic minor being disposed adjacent to said second concave parabolic minor, and said outwardly convex portions from each said minor being disposed opposite to each other;
    said second parabolic mirror having an aperture about and perpendicular to said central axis of said first and second mirrors, and said aperture having a perimeter, and the circumference of said perimeter forming a plane;
    said first illuminated object disposed between said mirrors and disposed adjacent to said first parabolic minor within the imaginary cylinder formed by said perimeter of said aperture, said combination thereby producing a real image being a high quality three-dimensional copy of said first illuminated object;
    said real image being perceptible for 360 degrees around said central axis by an observer exterior to said second mirror at an angle of perception 30 to 60 degrees above said plane looking toward said central axis, said angle of perception having an apex located at the intersection of said central axis and said plane;
    a second device which passes periodically through said real image of said object so that said second device actually passes through said perfectly similar, three-dimensional real image of said first illuminated object thereby creating a unique and incredible novelty device without any necessity of a projector or projection screen nor the necessity of a laser or holographic presentation.

2. The novelty device according to claim 1, further comprising:
    said first minor having a first mirror aperture centered on and perpendicular to said central axis of a diameter less than or equal to said aperture on said second mirror enabling insertion, change, and substitution of said first illuminated object thereby enabling a moving and changing presentation of said real image.

3. The novelty device according to claim 2, further comprising:
    said first minor aperture having a flat plate placed in it, and said illuminated object being disposed adjacent to said flat plate.

4. A novelty device enabling a second object to pass by and for a person or object in said second object to apparently reach out and pass through without damage a high quality three-dimensional copy of a first illuminated object, comprising:
    a first concave parabolic mirror having a central axis from the center of the mirror to the focal point of the minor and said first minor being outwardly convex from said focal point;
    a second concave parabolic minor having a central axis from the center of the mirror to the focal point of the mirror and said first minor being outwardly convex from said focal point, said central axis of said second mirror being coincident to said central axis of said first minor;
    said first concave parabolic minor being disposed adjacent to said second concave parabolic minor, and said outwardly convex portions from each said minor being disposed opposite to each other;
    said second parabolic mirror having an aperture about and perpendicular to said central axis of said first and second mirrors, and said aperture having a perimeter, and the circumference of said perimeter forming a plane;
    said first illuminated object disposed between said mirrors and disposed adjacent to said first parabolic minor within the imaginary cylinder formed by said perimeter of said aperture and said focal point of said second parabolic mirror, said combination thereby producing a real image being a high quality three-dimensional copy of said first illuminated object;

said real image being perceptible for 360 degrees around said central axis by an observer exterior to said second mirror at an angle of perception 30 to 60 degrees above said plane looking toward said central axis, said angle of perception having an apex located at the intersection of said central axis and said plane;

a second device capable of carrying a rider or a second object, which passes periodically adjacent to said real image of said illuminated object so that said rider or said second object in said second device can reach out, apparently touch, and pass through said perfectly similar, three-dimensional real image of said first object without any damage to said rider or said second object thereby creating a novelty device without any necessity of a projector or projection screen nor the necessity of a laser or holographic presentation.

5. The novelty device according to claim 4, further comprising:

said first mirror having a first minor aperture centered on and perpendicular to said central axis of a diameter less than or equal to said aperture on said second mirror enabling insertion, change, and substitution of said first illuminated object thereby enabling a moving and changing presentation of said real image.

6. The novelty device according to claim 5, further comprising:

said novelty device being an amusement park ride.

7. The novelty device according to any one of claims 1 through 6, further comprising:

said illuminated object being a holographic presentation of said illuminated object.

8. The novelty device according to any one of claims 1 through 6, further comprising:

said aperture of said second parabolic minor having a screen so that special effects can be added to said image or the first illuminated object can be partially obscured.

9. The novelty device according to any one of claims 1 through 6, further comprising:

said aperture of said second parabolic minor having a lens for modifying the size of said real image.

10. A novelty device whereby a second object passes without damage through a high quality three-dimensional copy of a first illuminated object, comprising:

two mirrors disposed opposite to each other having a central axis as between them defined as a line from a first focal point of said two minors to a second focal point of said two mirrors;

said two mirrors having at least one aperture about and perpendicular to said central axis of said first and second mirrors adjacent to said first focal point, and said aperture having a perimeter, and the circumference of said perimeter forming a plane;

said first illuminated object disposed between said mirrors and disposed adjacent to second focal point within the imaginary cylinder formed by said perimeter of said aperture extended toward said second focal point, said combination thereby producing a real image being a high quality three-dimensional copy of said first illuminated object;

said real image being perceptible for 360 degrees around said central axis by an observer exterior to said second mirror at an angle of perception 30 to 60 degrees above said plane looking toward said central axis, said angle of perception having an apex located at the intersection of said central axis and said plane;

a second device which passes periodically through said real image of said object so that said second device actually passes through said perfectly similar, three-dimensional real image of said first illuminated object thereby creating a novelty device without any necessity of a projector or projection screen nor the necessity of a laser or holographic presentation.

11. The novelty device according to claim 10, further comprising:

one of said at least one apertures adjacent to said first focal point being a first aperture;

another of said at least one apertures adjacent to said second focal point being a second aperture having the characteristics of being perpendicular to said central axis, having a perimeter, and the circumference of said perimeter forming a plane, and said second aperture enabling insertion, change, and substitution of said first illuminated object thereby enabling a moving and changing presentation of said real image.

12. The novelty device according to claim 11, further comprising:

said second aperture having a flat plate placed in it, and said illuminated object being disposed adjacent to said flat plate.

13. A novelty device enabling a second object to pass by and for a person or object in said second object to apparently reach out and pass through without damage a high quality three-dimensional copy of a first illuminated object, comprising:

two mirrors disposed opposite to each other having a central axis as between them defined as a line from a first focal point of said two minors to a second focal point of said two mirrors;

said two mirrors having at least one aperture about and perpendicular to said central axis of said first and second mirrors adjacent to said first focal point, and said aperture having a perimeter, and the circumference of said perimeter forming a plane;

said first illuminated object disposed between said mirrors and disposed adjacent to second focal point within the imaginary cylinder formed by said perimeter of said aperture extended toward said second focal point, said combination thereby producing a real image being a high quality three-dimensional copy of said first illuminated object;

said real image being perceptible for 360 degrees around said central axis by an observer exterior to said second mirror at an angle of perception 30 to 60 degrees above said plane looking toward said central axis, said angle of perception having an apex located at the intersection of said central axis and said plane;

a second device capable of carrying a rider or a second object, which passes periodically adjacent to said real image of said illuminated object so that said rider or said second object in said second device can reach out, apparently touch, and pass through said perfectly similar, three-dimensional real image of said first object without any damage to said rider or said second object thereby creating a novelty device without any necessity of a projector or projection screen nor the necessity of a laser or holographic presentation.

14. The novelty device according to claim 13, further comprising:

one of said at least one apertures adjacent to said first focal point being a first aperture;

another of said at least one apertures adjacent to said second focal point being a second aperture having the characteristics of being perpendicular to said central axis, having a perimeter, and the circumference of said perimeter forming a plane, and said second aperture enabling insertion, change, and substitution of said first illuminated object thereby enabling a moving and changing presentation of said real image.

15. The novelty device according to claim 14, further comprising:
said novelty device being an amusement park ride.

16. The novelty device according to any one of claims 10 through 15, further comprising:
said illuminated object being a holographic presentation of said illuminated object.

17. The novelty device according to any one of claims 10 through 15, further comprising:
said aperture having a screen so that special effects can be added to said image or the first illuminated object can be partially obscured.

18. The novelty device according to any one of claims 10 through 15, further comprising:
said aperture having a lens for modifying the size of said real image.

* * * * *